UNITED STATES PATENT OFFICE.

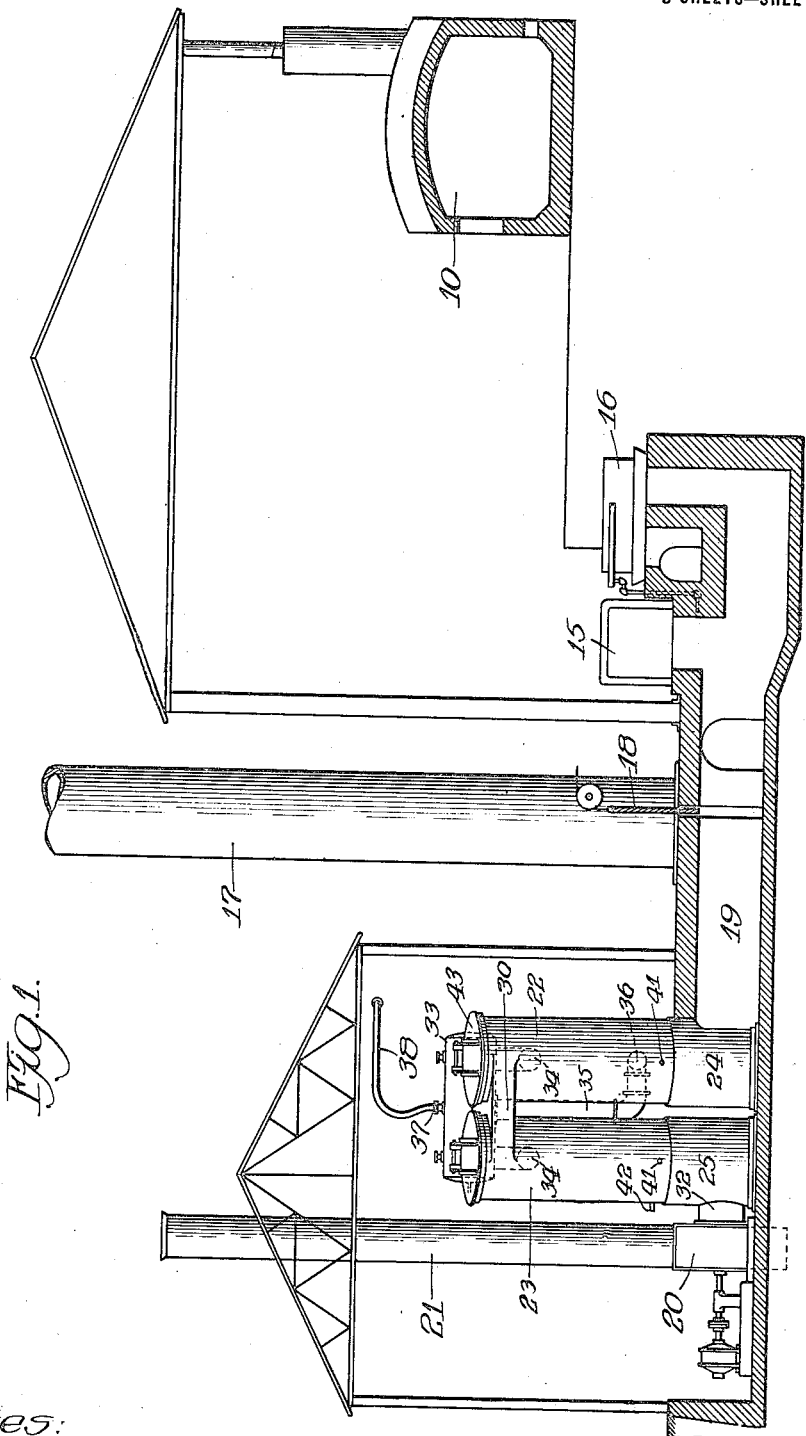

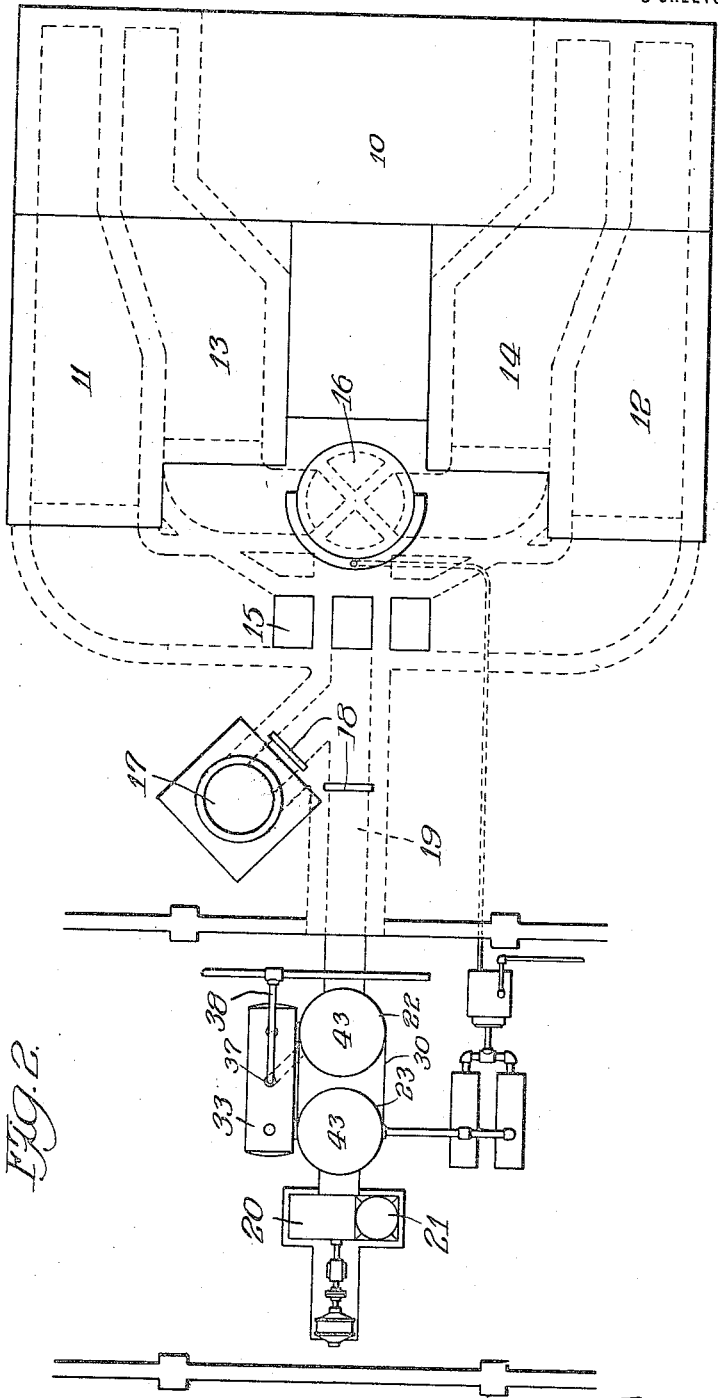

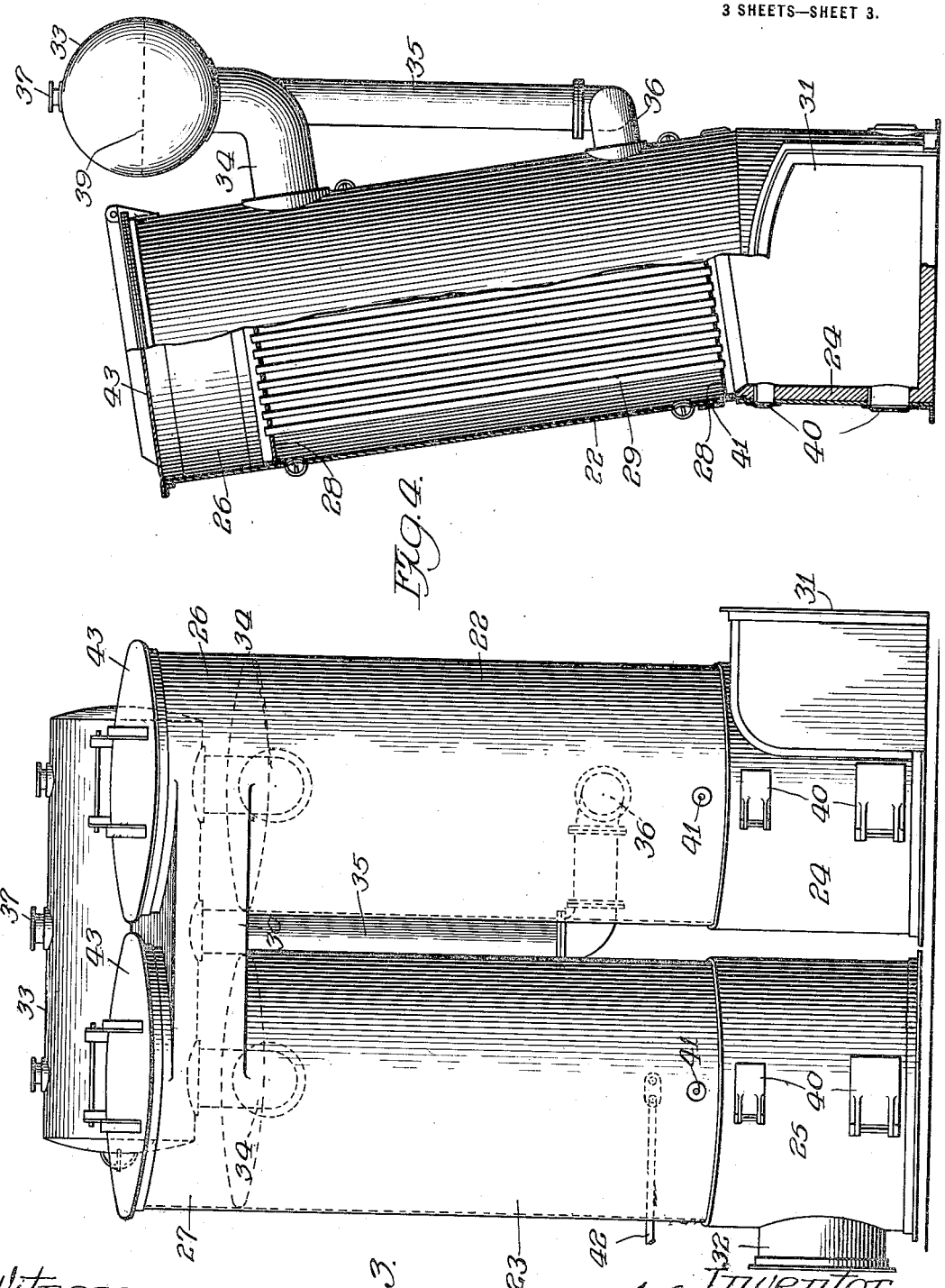

CHARLES J. BACON, OF CHICAGO, ILLINOIS.

BOILER FOR UTILIZING WASTE HEAT.

1,138,346.    Specification of Letters Patent.    Patented May 4, 1915.

Application filed January 7, 1915. Serial No. 1,022

*To all whom it may concern:*

Be it known that I, CHARLES J. BACON, a citizen of the United States, and resident of Chicago, in the county of Cook and State of Illinois, have invented certain new and useful Improvements in Boilers for Utilizing Waste Heat, of which the following is a specification.

My invention relates to fire tube boilers for recovering the heat in the waste gases from open hearth and other kinds of reversible regenerative furnaces for metallurgical purposes. Fire tube boilers have been applied to puddling, heating, and various other types of non-regenerative furnaces for many years and no claims are made for such applications. The use of boilers in combination with reversible regenerative furnaces involves peculiar conditions that require special treatment, as hereinafter set forth.

In what follows fire tube boilers are referred to as that type of multitubular boilers in which the hot gases pass through the tubes, which are surrounded by water and steam, as distinguished from the water tube type in which the hot gases are outside the tubes. Waste gases are understood herein as being the products of combustion of fuel burned primarily for another purpose than making steam in the boilers described.

The object of this invention is to provide a remedy for difficulties that interfere with and prevent the wholly successful operation of water tube boilers heretofore used in combination with regenerative furnaces.

Another object is to produce an over-all thermal efficiency as high as with water tube boilers with a lower cost of installation and operation.

From experience gained from water tube boilers already in service in connection with open hearth furnaces it is evident that certain conditions peculiar to the waste gases, taken in connection with characteristic constructional features of the water tube type of boiler, produce disadvantageous results. Foremost among these conditions is the requirement of regenerative type of furnaces that a considerable induced draft be maintained in the gas flues leading therefrom, to draw the gases through the tortuous passages of the regenerative chambers containing the usual brick checkers which greatly obstruct the passage of gases. The draft thus required at the inlet to the boiler frequently is one and one-half inches of water or more, and increases to four or five inches at the boiler outlet, due to friction through the boiler. On account of this high draft the air leakage through the brick settings of water tube boilers is the cause of considerable loss of efficiency of the boilers themselves, as well as increasing the power for driving the induced draft fans, and the most attentive efforts toward keeping the setting tight are only partly successful. With fire tube boilers, however, no trouble of this sort is experienced since there is no chance for leakage through the shell proper nor through the steel plate flues connecting thereto.

Explosions in the waste gas flues are characteristic of open hearth furnaces using preheated gas, and are due to the escape of gas into the flues while reversing the gas valves. These explosions are exceedingly troublesome in loosening the brick work of the water tube boilers settings, thereby increasing air leakage and involving a high expense for repairs. In the fire tube type these explosions do no damage on account of the strong and tight steel casing.

The dust coming from the open hearth furnaces and checker chambers is in an exceedingly fine and adherent condition, packing closely onto the tubes of the water tube boilers as well as on all projections of any kind. In the fire tube type the dust would not readily collect on the surface of the tubes, especially when in vertical position since the gases pass through the smooth tubes at a high velocity. Although a small amount of dust collects on the tube sheets and other surfaces against which the gases impinge, nevertheless such locations are easily cleaned.

In the fire tube type the straight tubes may be effectively blown while the boiler is in operation by means of permanent steam nozzles, so arranged that steam jets may be directed through the tubes by a few manipulations. All valves and levers may be exterior to the boiler shell, thereby preventing air leakage and at the same time giving the most effective sweeping action through the tubes. Cleaning the dust from the water tube boilers while in operation is attempted by the use of permanent or hand-blowing pipes from which jets of steam sweep over such portions of the surface and recesses as can be reached. This requires considerable time each day, is not wholly effective, and in the case of hand blowers allows large amounts of air to enter the setting through the cleaning doors.

Cleaning water tube boilers while out of service can be done only by allowing the boilers to cool sufficiently for the workmen to enter the setting and brush the tubes with brooms and remove the dust from the various recesses by shoveling it out through the cleaning doors. In the fire tube type the tubes that are not kept clean by means of the steam jets may be brushed out with wire brushes on long handles, or by other convenient and effective means, without waiting for the boiler to cool. Similarly the dirt collecting in the gas box and other spaces would be removed by brushes and other tools without the necessity of cooling off the boiler.

Available space for boilers in existing open hearth plants is, as a rule, exceedingly limited. The type of fire tube boiler herein described has a form of construction that is flexible as to diameter and length; moreover, it may be used in horizontal, vertical or inclined positions and may be used as a single boiler or divided into a number of smaller sections or passes through which the gas may pass in series or parallel. This flexible construction favors the most efficient arrangement of the heating surface. Certain arrangements and positions of these fire tube boilers provide for water circulation on the counter-current principle, by admitting the water as nearly as possible to the gas exit, thereby favoring high efficiency of heat transfer and preventing the formation of hard scale from impure feed water.

The invention will be more readily understood by reference to the accompanying drawings, wherein—

Figure 1 is a sectional elevation somewhat diagrammatical in form, through an open hearth and steam generating plant; Fig. 2 is a plan view of the same, also diagrammatically arranged. Fig. 3 is a side elevation of a two-pass fire tube boiler, such as contemplated by me; and Fig. 4 is an end view of one of the units with the shell partly broken away.

Referring more particularly to the drawings it will be seen that the open hearth furnace is designated at 10, each furnace being provided with air-regenerative chambers 11, 12, and gas-regenerative chambers 13, 14. These chambers and the direction of flow of gases are controlled by reversing valves 15, 16 by means of which air and waste gases are successively passed through the regenerative chambers in a manner well known. A stack 17 may be provided and gates 18 may at will direct the waste gases into this stack or into the flue 19 and through the waste heat boilers. If the waste gases are directed to the boilers a fan 20 is usually employed by means of which the draft may be increased and the cooled gases forced out through the stack 21, after having given up a portion of their heat through the waste heat boilers.

The boilers, such as contemplated by me, are best shown in Figs. 3 and 4 and are of the two-pass type. The boilers include shells 22, 23 having gas boxes 24, 25, 26, 27 at the lower and upper ends, respectively, these boxes being separated from the water spaces by tube sheets 28 within which the fire tubes 29 are secured. The top gas boxes 26, 27 are connected by the flue 30. The gases enter at the point 31 in Fig. 3 passing upwardly through the first pass, through the flue 30 and hence downward through the second pass and out at 32. Mounted above the boilers is a steam drum 33 which is connected to each of the boilers by the pipes 34. A water leg 35 extends downward from the steam drum and enters the first pass at the point 36. The steam generated may be taken off at the point 37 through the pipe 38 and conveyed to a distance for use as required. Preferably water will be maintained in the steam drum to the height of the dotted line 39 in Fig. 4. Thus the upper tube sheets of the boilers are always protected. Cleanout doors are provided as at 40. At the bottom of each pass I provide openings 41 by means of which the boilers may be blown off. The feed water enters through the pipe 42 at the lower end of the second pass. This is an important point for the reason that the gas has at that time given off a large portion of its heat and the scale-forming compounds are precipitated and may be readily removed through the blow-off connection. On account of the low temperature of the gas at this point the tendency of these precipitates to form a hard scale on the surfaces is minimized. Practically all of the scale-forming compounds are precipitated in the second pass, and, therefore, there is but little coating of the tubes in the first pass where the heat is the greatest. It will readily be seen that the fire tubes may be effectively cleaned by steam jets introduced through the covers 43 or otherwise, without stopping operations and allowing the boilers to cool down. This is an important advantage in the use of the fire tube instead of a water tube boiler.

Obviously, of course, the construction here illustrated is only typical of other forms which might be evolved from the present disclosure, and I do not, therefore, wish to be limited to the construction herein shown and described.

I claim:

1. In a waste heat boiler for utilizing exhaust gases from a regenerative metallurgical furnace, the combination of a first pass and a second pass, said passes consisting in shells containing water and provided with fire tubes, and a steam drum above the level of the connection between adjacent passes, substantially as described.

2. A device for utilizing waste heat from the exhaust gases of regenerative metallurgical furnaces comprising in combination a two-pass fire tube boiler, and means for admitting feed water at the lower end of the second pass, substantially as described.

3. In a device for utilizing waste heat from regenerative metallurgical furnaces, the combination of a pair of fire tube boilers located in juxtaposition and connected by a flue at their upper ends, means for admitting waste gases at the lower end of the first pass and discharging the same at the lower end of the second pass, and means for admitting feed water at the coolest point in said boilers, substantially as described.

CHARLES J. BACON.

Witnesses:
WILLIAM J. WHITE,
H. T. ROBERTS.

Copies of this patent may be obtained for five cents each, by addressing the "Commissioner of Patents, Washington, D. C."